US012385456B2

(12) United States Patent
Bonfigli et al.

(10) Patent No.: US 12,385,456 B2
(45) Date of Patent: Aug. 12, 2025

(54) FUEL-RAIL ASSEMBLY

(71) Applicant: PHINIA DELPHI LUXEMBOURG SARL, Belvaux (LU)

(72) Inventors: Fabrizio Bonfigli, Mont Prés Chambord (FR); Jérôme Calonne, Blois (FR); Allan R. Wells, North Chili, NY (US); Aurélie Jarrige, Pray (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/722,931

(22) PCT Filed: Dec. 22, 2022

(86) PCT No.: PCT/EP2022/087438
§ 371 (c)(1),
(2) Date: Jun. 21, 2024

(87) PCT Pub. No.: WO2023/118415
PCT Pub. Date: Jun. 29, 2023

(65) Prior Publication Data

US 2025/0059939 A1 Feb. 20, 2025

(30) Foreign Application Priority Data

Dec. 22, 2021 (GB) ...................................... 2118710

(51) Int. Cl.
*F02M 69/46* (2006.01)
*F02M 55/00* (2006.01)
*F02M 55/02* (2006.01)

(52) U.S. Cl.
CPC ........ *F02M 55/025* (2013.01); *F02M 55/005* (2013.01); *F02M 2200/8076* (2013.01)

(58) Field of Classification Search
CPC ......... F02M 2200/8076; F02M 61/168; F02M 55/004; F02M 2200/16; F02M 2200/855
(Continued)

(56) References Cited

U.S. PATENT DOCUMENTS 7,461,636 B2 12/2008 Ricco et al.
10,801,457 B1 * 10/2020 Masti .................. F02M 63/028
(Continued)

FOREIGN PATENT DOCUMENTS

EP 1118766 A2 7/2001
EP 1752655 B1 9/2007
(Continued)

OTHER PUBLICATIONS

International Search Report for PCT/EP2022/087438 dated Mar. 20, 2023, 4 pages.
(Continued)

*Primary Examiner* — Logan M Kraft
*Assistant Examiner* — James J Kim
(74) *Attorney, Agent, or Firm* — WARNER NORCROSS + JUDD LLP

(57) ABSTRACT

A fuel-rail assembly, comprising
an injector having a proximally disposed inlet portion defining an inlet channel and extending along an axial direction,
a fuel rail connected to the inlet portion via an outlet portion that defines an outlet channel,
a nut element having an inner thread and at least indirectly engaging the outlet portion to transfer an axial clamp force by which a first contact surface of the inlet portion is pressed against a second contact surface of the outlet portion to provide a fluid-tight connection between the inlet channel and the outlet channel.
In order to enable a wide flow path into an injector while maintaining an easy assembly process of the injector, the
(Continued)

fuel-rail assembly comprises an adapter with an axially extending through-opening in which the inlet portion is at least partially received.

11 Claims, 5 Drawing Sheets

(58) Field of Classification Search
USPC .......................................................... 123/456
See application file for complete search history.

(56) References Cited

U.S. PATENT DOCUMENTS

| | | | | |
|---|---|---|---|---|
| 10,995,716 | B1 * | 5/2021 | Masti | F02M 61/168 |
| 10,995,720 | B1 * | 5/2021 | Masti | F02M 55/005 |
| 2003/0152424 | A1 * | 8/2003 | Nieslony | F02M 61/168<br>403/403 |
| 2016/0102641 | A1 | 4/2016 | Harter | |
| 2021/0246859 | A1 * | 8/2021 | Hardouin | F02M 61/168 |

FOREIGN PATENT DOCUMENTS

| | | | |
|---|---|---|---|
| JP | 2010133326 | A | 6/2010 |
| WO | 2008057030 | A1 | 5/2008 |

OTHER PUBLICATIONS

Machine assisted English translation of EP1118766A2 obtained from https://patents.google.com/patent on Jun. 13, 2024, 7 pages.
Machine assisted English translation of JP2010133326A obtained from https://patents.google.com/patent on Jun. 13, 2024, 8 pages.

* cited by examiner

FUEL-RAIL ASSEMBLY

CROSS-REFERENCE TO RELATED APPLICATIONS

This application is the U.S. National Stage of International Application No. PCT/EP2022/087438 filed on 22 Dec. 2022, which claims priority to and all advantages of United Kingdom Application No. 2118710.9 filed on 22 Dec. 2021, the contents of which are incorporated herein by reference.

TECHNICAL FIELD

The invention relates to fuel injection systems and in particular to a fuel-rail assembly.

BACKGROUND ART

Fuel injectors are used in combustion engines to inject fuel e.g. into a runner of an air intake manifold ahead of a cylinder intake valve or directly into the combustion chamber of an engine cylinder. In most cases and for cost reduction reasons, the injector is directly attached to a common fuel rail, but sometimes a high-pressure pipe can be connected between the fuel rail and the injector. Injectors for GDI (gasoline direct injection) are currently rated for injection pressures up to 350 bar, but there is a tendency to increase injection pressure of GDI injectors, e.g., to 600 bar and more. With increasing pressure, the injector must be sealed to the component feeding fuel to the injector. The sealing is currently achieved by several elastomer O-rings (one primary ring and one or two back-up rings). However, this sealing method is unreliable at a pressure of 600 bar or more under engine environment conditions, which involve cycling pressure, chemical aggression, temperature fluctuation, vibration, etc. This problem has been addressed by using a metal-metal contact for sealing purposes, either with a high-pressure pipe between the injector and the rail, or by directly connecting the injector to the rail.

Commonly, a fluid-tight connection is achieved with a sphere-cone metal contact, while the axial pretension can e.g., be exerted by a cap nut that is connected to the pipe and is screwed onto an outer thread on the injector. Due to the size of common engine components and, in particular, the size of injectors commonly used today, there are basically two options for the size of the thread, namely M12 and M14, both of which lead to problems. An M12 thread requires a small diameter of an inlet fuel path into the injector, which reduces the flow passage and the maximum possible injection quantity. An M14 thread allows for a reasonably large inlet fuel path but leads to problems during assembly of the injector. A common assembly process provides that the annular solenoid of the injector is passed over the inlet section, wherefore the outer diameter of the inlet section may not be larger than the inner diameter of the solenoid. An M14 thread on the inlet section would therefore require a larger inner diameter of the solenoid and thus a considerable re-design of the injector.

Technical Problem

It is thus an object of the present invention to enable a wide flow path into an injector while maintaining an easy assembly process of the injector.

This problem is solved by a fuel-rail assembly according to claim 1.

GENERAL DESCRIPTION OF THE INVENTION

The invention provides a fuel-rail assembly, more specifically a fuel-rail assembly for a combustion engine. The assembly is part of a fuel supply system of the combustion engine, e.g., a traction engine of a car.

The fuel-rail assembly comprises an injector having a proximally disposed inlet portion defining an inlet channel and extending along an axial direction, as well as a fuel rail connected to the inlet portion via an outlet portion that defines an outlet channel.

Generally, the fuel rail is designed to contain fuel and deliver the fuel to at least one injector, normally a plurality of injectors. It either comprises (for each injector) or is connected to an outlet portion that defines an outlet channel. In other words, the outlet channel is disposed inside the outlet portion. The outlet channel(s) may branch off a main channel of the fuel rail. The outlet portion may be a part of the fuel rail or of a high-pressure pipe, which is connected to the fuel rail. The entire fuel rail, as well as the high-pressure pipe (if present), may be made of metal. These components are designed to contain fuel under high pressure, e.g., of at least 400 bar, at least 500 bar or at least 600 bar.

The injector is designed to receive fuel from the fuel rail and to inject this fuel into a cylinder of the combustion engine. It has an inlet portion (normally made of metal, e.g., the same metal as the fuel rail), which inlet portion defines an inlet channel, i.e., the inlet channel runs through the inlet portion. The inlet portion is disposed proximally, or on a proximal side of the injector. The injector receives fuel on the proximal side and ejects fuel into the engine on a distal side, where it has a nozzle. The proximal side may also be referred to an "upper side" and the distal side may be referred to as a "lower side". Like the outlet portion, the inlet portion is designed to contain fuel at high pressure. The inlet portion, and normally the inlet channel, extend along a direction that is herein referred to as the axial direction, thereby implicitly also defining a radial direction and a tangential direction. The inlet channel may be straight or at least have a straight portion that extends in the axial direction, either being aligned with the axial direction or being tilted with respect to the axial direction by less than 10° or less than 5°. The axial direction may also correspond to a symmetry axis of the inlet channel. The same may apply to the outlet channel. The outlet portion and the inlet portion are connected and more specifically, the outlet channel and the inlet channel are connected, i.e., they are in fluid communication.

The fuel rail assembly further comprises a nut element having an inner thread and at least indirectly engaging the outlet portion to transfer an axial clamp force by which a first contact surface of the inlet portion is pressed against a second contact surface of the outlet portion to provide a fluid-tight connection between the inlet channel and the outlet channel. Normally, the nut element may also be referred to as a nut or more specifically, a cap nut. It may comprise an outer profile that facilitates screwing and unscrewing (e.g., a hexagonal profile). The nut element partially surrounds the outlet portion, i.e., the outlet portion is partially received inside the nut element. It has an inner thread, which may, e.g., be an M14 thread. It engages the outlet portion to transfer an axial clamp force. The interaction between the nut element and the outlet portion is normally by a form fit along the axial direction. E.g., in case of a cap nut, an inward facing flange of the cap nut may engage an outward facing flange of the outlet portion.

The clamp force acts in the axial direction, which is not to be construed in that there are no force components acting in a different direction. The clamp force establishes a fluid-tight connection between the inlet channel and the outlet channel. Specifically, the inlet portion comprises a first contact surface pressed against a second contact surface of the outlet portion, thereby providing a fluid-tight connection between the inlet channel and the outlet channel. The first and second contact surfaces are pressed together as a result of the clamp force, although the amount of force acting between these surfaces may differ from the clamp force. It should be noted that neither of the first contact surface and the second contact surface needs to be pressed against the other contact surface in its entirety. One could say that the first contact surface is at least partially pressed against the second contact surface. However, there is a contact area or line that extends circumferentially around the inlet channel or the outlet channel, respectively. Due to the clamp force, which may lead to some deformation of the inlet portion and/or the outlet portion, no fuel can escape through the contact area so that the inlet channel and the outlet channel are connected in a fluid-tight manner. As a rule, each of the first and second contact surface is annular and surrounds at least one of the channels.

According to the invention, the fuel-rail assembly also comprises an adapter with an axially extending through-opening in which the inlet portion of the injector is at least partially received, and with an outer thread that engages the inner thread, which adapter is at least indirectly pressed against the inlet portion to transfer the clamp force. The adapter may be made of a single piece, normally a piece of metal. It comprises an axially extending through-opening, wherefore it comprises a tangentially extending, e.g., tubular, portion surrounding the through-opening. The inlet portion of the injector is (fully or partially) received in the through-opening, i.e., the adapter surrounds the inlet portion. The adapter has an outer thread (e.g., an M14 thread) that engages the inner thread of the nut element, i.e., the adapter and the nut element are screwed together, thereby tightening the connection between the inlet portion and the outlet portion and creating or increasing the clamp force. The adapter may also comprise an outer profile (e.g., hexagonal) that facilitates screwing and unscrewing. The adapter either directly or indirectly presses against the inlet portion. In the latter case, there is no direct contact between the adapter and the inlet portion, but the force is transferred from the adapter to the inlet portion by an additional element in between. The pressure is also a result of the clamp force, although the force acting between the adapter and the inlet portion may differ from the clamp force. One could also say that the flow of forces runs from the outlet portion through the nut element and the adapter (and the additional element, if present) to inlet portion of the injector.

The adapter enables adaption of the connection to a larger thread size (e.g. M14 instead of M12) without the need to enlarge the inlet portion of the injector. Accordingly, it is possible to pass a solenoid over the inlet portion during assembly of the injector without any need to change the dimensions of the solenoid as compared to an injector having a smaller thread disposed on the inlet portion. Also, since the adapter transfers the clamp force by pressing against the inlet portion, there is no need for a friction connection or even a material bond between the adapter and the inlet portion. Rather, the clamp force can be transferred by a form fit, either directly between the adapter and the inlet portion or indirectly, via an additional element. In any case, the adapter can be placed more or less loosely over the inlet portion during the assembly process, whereafter the inner and outer thread are screwed together. This facilitates the assembly process.

At least one intermediate element is interposed between the adapter and the inlet portion, and the adapter indirectly engages the inlet portion via the at least one intermediate element. One reason for this configuration is that the assembly process is facilitated. Another reason is that the intermediate element can potentially be cheaper and simpler than the clamp element, which reduces the potential costs for a replacement.

In embodiments at least one of the inlet portion and the adapter comprises a radially extending recess in which at least one intermediate element is partially disposed and at least one intermediate element is elastically deformable to be movable into the recess. In case of the adapter, the recess extends radially outward, while in case of the inlet portion, the recess extends radially inward. On the one hand, the intermediate element can be axially retained by the recess. On the other hand, by elastic deformation of the intermediate element, it can be moved (further or even fully) into the recess during assembly, thereby enabling relative movement of the inlet portion and the adapter.

Preferably, an intermediate element is a snap ring made of metal. In this case, there may be only a single intermediate element, namely the snap ring. The snap ring may be made of spring steel, i.e., a steel that facilitates a certain amount of elastic deformation (compression/expansion). The snap ring is circular, but not fully annular, i.e. it is not closed, but comprises a gap along the tangential direction, which allows for an adaption to different diameters. In particular, the snap ring may be compressed during assembly allow the adapter to be passed over the inlet portion.

The geometry and the elasticity of the snap ring may be chosen in different ways depending on the embodiment. The degree to which the snap ring can be deformed not only depends on its elasticity, but also on its tangential extension or the tangential extension of the gap. It will be understood that this defines a maximum possible compression of the snap ring. Preferably, the snap ring tangentially extends over between 300° and 340°, more preferably over between 310° and 330°. For example, if the snap ring extends over 320° in its undeformed state, it can be compressed by approximately 11% at maximum.

In embodiments one of the first contact surface and the second contact surface is spherical and the other is conical. In other words, one contact surface is convex and represents a portion of a sphere, while the other contact surface is conical, which in this context, also includes "frusto-conical". In this embodiment, the other contact surface corresponds to the lateral surface of a cone (or truncated cone). Both contact surfaces enable a sphere-cone connection, with a circular contact area in which the surfaces are pressed against each other. The conical contact surface is normally symmetric with respect to the axial direction. For instance, the first contact surface may be conical and may define an end portion of the inlet channel that widens proximally. This can be combined with a spherical second contact surface.

According to one embodiment, the inlet portion comprises a first annular recess, which extends radially inwards and in which the snap ring is partially disposed. The recess extends along the tangential direction on an outer side of the inlet portion. It represents a narrow portion in which the snap ring can be e.g. partially received in its undeformed shape. A neighboring portion of the injector is wider and therefore the snap ring may need to be elastically deformed to pass over this portion and reach its position in the recess. Also, the snap ring may be elastically compressible to be fully received in the first annular recess.

The adapter may comprise a second annular recess, which extends radially outwards and in which the snap ring is partially disposed. The second annular recess represents a widened portion of the through-opening. During assembly, the snap ring may be temporarily compressed before it can expand into the second annular recess. In this case the snap ring can first be partially inserted into the first annular recess and afterwards adapter can be passed over the inlet portion, while the snap ring can temporarily be compressed into the first annular recess. When the second annular recess is in the position of the snap ring, the snap ring expands into the second annular recess, thereby establishing a form-fit with the adapter in the axial direction.

One embodiment provides that the first annular recess is at least partially defined by a first proximal surface that engages the snap ring and is inclined by less than 50° with respect to the axial direction, and a first distal surface, which is distally disposed from the first proximal surface and is inclined by more than 60° with respect to the axial direction. The recess is "defined" by the respective surface in that it is delimited by this surface. The first proximal surface has a relatively low or moderate inclination of less than 50° with respect to the axial direction, although this is normally at least 10° or at least 20°. Accordingly, when during assembly, the snap ring is moved axially along the first proximal surface, a radial force component can act on the snap ring that increases gradually. In assembled state, the first proximal surface engages the snap ring, which is a result of the clamp force. The first distal surface, on the other hand, has a relatively high inclination of more than 60° (and possibly up to 90°) with respect to the axial direction. If the snap ring is moved axially against the first distal surface, the result is mainly an axial force that stops the movement of the snap ring. One could say that the first distal surface defines an end position of the snap ring within the first annular recess. The two surfaces are inclined in opposite directions, so that the first proximal surface faces distally, while the first distal surface faces proximally. It should be noted that the first proximal surface and the first distal surface are not necessarily disposed next to each other, but there may be a "transition" surface in between.

Also, the second annular recess may at least partially be defined by a second proximal surface that is inclined by less than 50° with respect to the axial direction, and a second distal surface, which is distally disposed from the first proximal surface, engages the snap ring and is inclined by more than 60° with respect to the axial direction. The inclination of the second proximal surface is normally at least 10° or at least 20°. Accordingly, when during assembly, the second proximal surface is moved axially along the snap ring, a radial force component can act on the snap ring that increases gradually and may gradually compress the snap ring. The second distal surface, on the other hand, has a relatively high inclination of more than 60° (and possibly up to 90°) with respect to the axial direction. If the second distal surface is moved axially against the snap ring, the result is mainly an axial force that stops the movement, thereby defining an end position of the snap ring within the second annular recess. In assembled state, the second distal surface engages the snap ring, which is a result of the clamp force. The two surfaces are inclined in opposite directions, so that the second proximal surface faces distally, while the second distal surface faces proximally. It should be noted that the second proximal surface and the second distal surface are not necessarily disposed next to each other, but there may be a "transition" surface in between.

According to one embodiment, the adapter comprises a distal entrance surface, which is inclined by less than 50° with respect to the axial direction. The distal entrance surface is disposed around a distal end of the through-opening and is inclined so that it faces distally. Accordingly, if the adapter is moved distally over the snap ring, the distal entrance surface is normally the first surface to make contact with the snap ring. In the process, a radial force component acts on the snap ring that increases gradually and compresses the snap ring, whereby the snap ring may be pushed further into the first annular recess.

To facilitate assembly of the fuel-rail assembly, the adapter may be designed to be rotatable about the inlet portion. Once the inner and outer thread are engaged and the full clamp force is applied, rotation of the adapter may be impossible or at least severely hindered. However, there is no tangential form fit between the adapter and the inlet portion that would prevent such rotation. In particular, when the adapter is placed over the inlet portion, its tangential orientation is irrelevant. Also, the rotatability of the adapter may prevent unwanted jamming between the adapter and the inlet portion during assembly.

The inlet portion may comprise a mouth portion, which comprises the first contact surface, and a first retainer portion on which the first annular recess is disposed and which is disposed distally from the mouth portion. The mouth portion and the first retainer portion may be disposed adjacent each other or be spaced from each other, with another portion disposed in between.

The adapter may comprise a threaded portion, which comprises the outer thread and at least partially surrounds the mouth portion, and a second retainer portion, which engages the snap ring and which is disposed distally from the thread portion. The mouth portion and the first retainer portion may be disposed adjacent each other or be spaced from each other, with another portion disposed in between. In particular, the second retainer portion may comprise the abovementioned second annular recess.

According to one preferred embodiment, a maximum radial outer dimension of the mouth portion is smaller than a maximum radial outer dimension of the first retainer portion, and a minimum radial inner dimension of the thread portion is smaller than a minimum radial inner dimension of the second retainer portion. It will be understood that there is a correspondence between the minimum radial inner dimension of the thread portion and the maximum radial outer dimension of the mouth portion since these portions are disposed adjacent each other. Likewise, there is a correspondence between the minimum radial inner dimension of the second retainer portion and the maximum radial outer dimension of the first retainer portion. As a rule, the outer/inner radial dimension corresponds to an outer/inner diameter. The first retainer portion has a relatively large radial outer dimension, which allows for a larger radial depth of the first annular recess, so that the snap ring may be received in its entirety inside the recess. The mouth portion, on the other hand, has a smaller outer dimension, which in turn allows for a smaller dimension of the thread portion and the outer thread.

BRIEF DESCRIPTION OF THE DRAWINGS

Preferred embodiments of the invention will now be described, by way of example, with reference to the accompanying drawings, in which.

DESCRIPTION OF PREFERRED EMBODIMENTS

Figure 1:
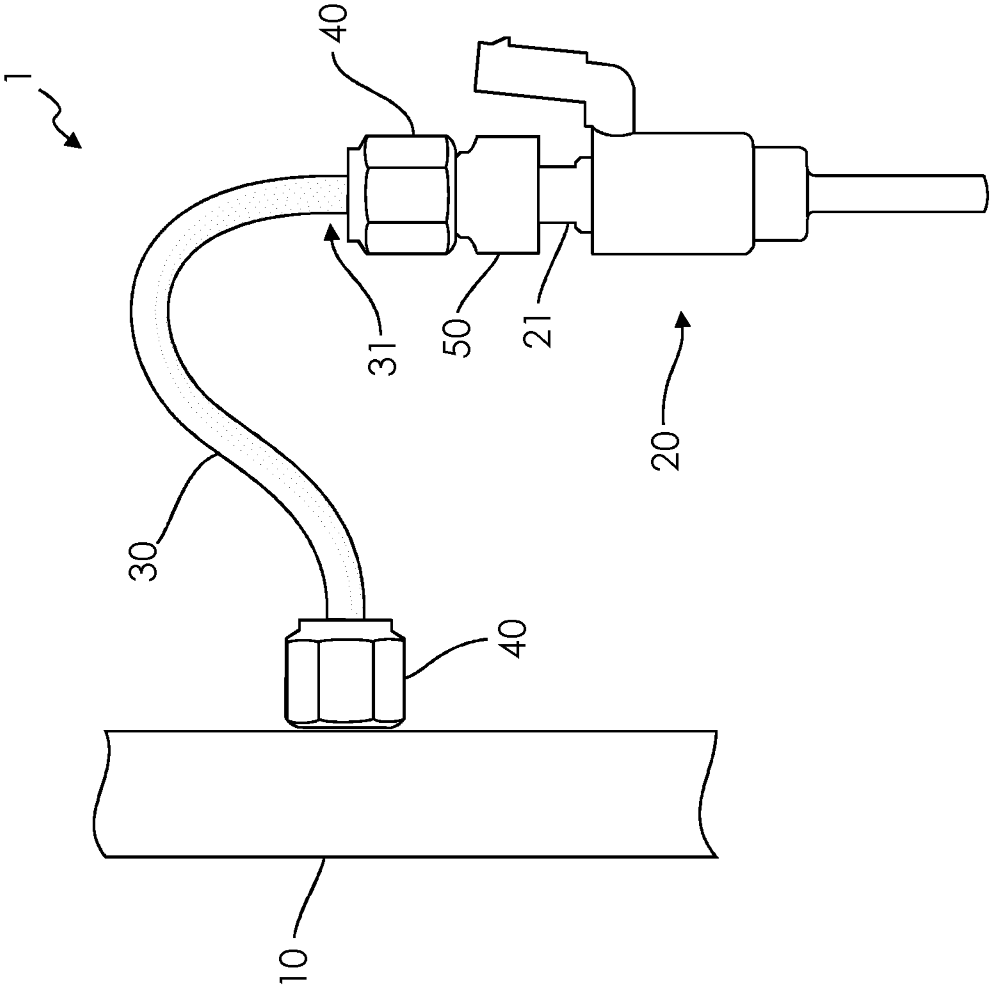
FIG. 1 shows a first embodiment of an inventive fuel-rail assembly.
Figure 2:
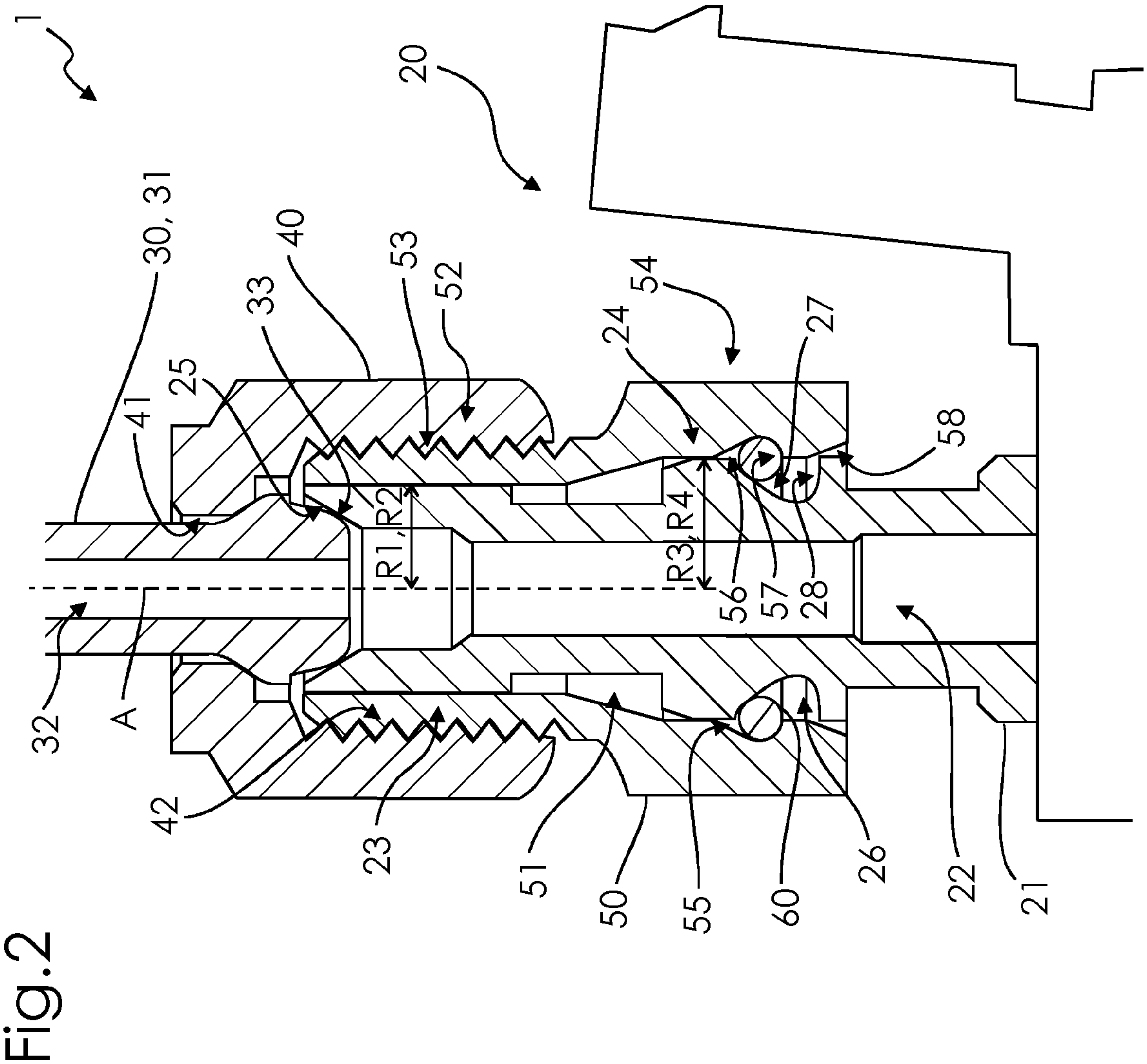
FIG. 2 is a partial sectional view of a part of the fuel-rail assembly of FIG. 1.

FIGS. 1 and 2 show a fuel-rail assembly 1 according to a first embodiment of the invention, which can be used in an internal combustion engine of e.g. an automotive vehicle. The fuel-rail assembly 1 comprises a fuel rail 10 that conveys and distributes fuel to a plurality of injectors 20, one of which is shown in the FIG. 1. Each injector 20 is connected to the fuel rail 10 by a high-pressure pipe 30. The fuel rail 10 and the high-pressure pipe 30 are made of metal. The pipe 30 has an outlet portion 31 that defines an outlet channel 32.

The fuel rail 10 typically comprises an elongate tubular body being e.g. made from forged steel (e.g. stainless steel). The tubular body is generally hollow and defines an internal fuel reservoir or main channel that extends along the length of the tubular body. The main channel is connected to a high-pressure pump (not shown) that supplies fuel to the fuel rail at in a conventional manner. The fuel rail 10 further comprises a plurality of fuel injector interface portions, formed by radial projections, that are spaced apart along the length of the tubular body. In FIG. 1, nut 40 is connected to such outlet portion, and thus hidden.

The injector 20 has an inlet portion 21 made of metal, which defines an inlet channel 22 that is parallel to an axial direction A, which also corresponds to a symmetry axis of the inlet channel 22. The inlet channel 22 is connected to the outlet channel 32 in the axial direction A, i.e., it communicates with the outlet channel 32 to receive fuel from the fuel rail 10 via the pipe 30. A first contact surface 25 of the inlet portion 21 is in contact with a second contact surface 33 of the outlet portion 31.

The injector 20 conventionally comprises a nozzle valve with spray orifice(s) controlled by a needle that can be selectively reciprocally moved in order to open or close the nozzle. The needle is controlled by an actuator, generally comprising a solenoid.

A nut element 40, in this case a cap nut, partially surrounds the outlet portion 31. An inward facing flange 41 of the nut element engages a collar of the outlet portion 31, thereby establishing an axial form fit. An inner thread 42 of the nut element 40 engages an outer thread 52 of a roughly annular adapter 50 that surrounds a major part of the inlet portion 21. In other words, a major part of the inlet portion 21 is received in an axially extending through-opening 51 of the adapter 50. The outer thread 52 is disposed in a thread portion 53 of the adapter 50 that surrounds a mouth portion 23 of the inlet portion 21. Distally from the mouth portion 23, a first retainer portion 24 of the inlet portion 21 is surrounded by a second retainer portion 54 of the adapter 50. A maximum outer radius R1 of the mouth portion 23 is almost identical to a minimum inner radius R2 of the thread portion 53, while a maximum outer radius R3 of the first retainer portion 24 is almost identical to a minimum inner radius R4 of the second retainer portion 54, so that there is only negligible radial play between the adapter 50 and the inlet portion 21. The maximum outer radius R1 of the mouth portion 23 (and the minimum inner radius R2 of the thread portion 53, respectively) is smaller than the maximum outer radius R3 of the first retainer portion 24 (and the minimum inner radius R4 of the second retainer portion 54). This allows for a comparably small outer thread 52 (in this case, an M14 thread), while on the other hand providing enough space for a first annular recess 26 that extends radially inward in the first retainer portion 24. On a proximal side, the first annular recess 26 is delimited by a first proximal surface 27, which in this case is inclined by about 40° with respect to the axial direction A. On a distal side, the first annular recess 26 is delimited by a first distal surface 28, which in this case is inclined by about 90° with respect to the axial direction A.

The second retainer portion 54, and the other hand, comprises a second annular recess 55 that extends radially outwards. On a proximal side, the second annular recess 55 is delimited by a second proximal surface 56, which in this case is inclined by about 40° with respect to the axial direction A. On a distal side, the second annular recess 55 is delimited by a second distal surface 57, which in this case is inclined by about 70° with respect to the axial direction A. A snap ring 60, serving as an intermediate element, is partially disposed in the first annular recess 26 and the second annular recess 55. In this case, the snap ring 60, in its undeformed state, extends tangentially over 320°, i.e. it has a 40° gap. Snap ring 60 thus acts a retainer ring and is generally formed as an annular member with a cut section (gap-circumference of less than 360°) or having a bit more than one loop (when >360°). The second distal surface 57 of the adapter 50 presses against the snap ring 60, which in turn presses against the first proximal surface 27 of the inlet portion. Accordingly, a flow of force runs from the outlet portion 31 through the nut element 40, the adapter 50 and the snap ring 60 to the inlet portion 21. This results in an axial clamp force pressing a conical first contact surface 25 of the inlet portion 21 against a spherical second contact surface 33 of the outlet portion 31. At its distal end, the adapter 50 comprises a distal entrance surface 58, which is in this case inclined by 40° with respect to the axial direction A. This distal entrance surface 58 has a special function during the assembly process of the fuel-rail assembly, which will now be explained with respect to FIG. 3A to 3E.

Figure 3B:
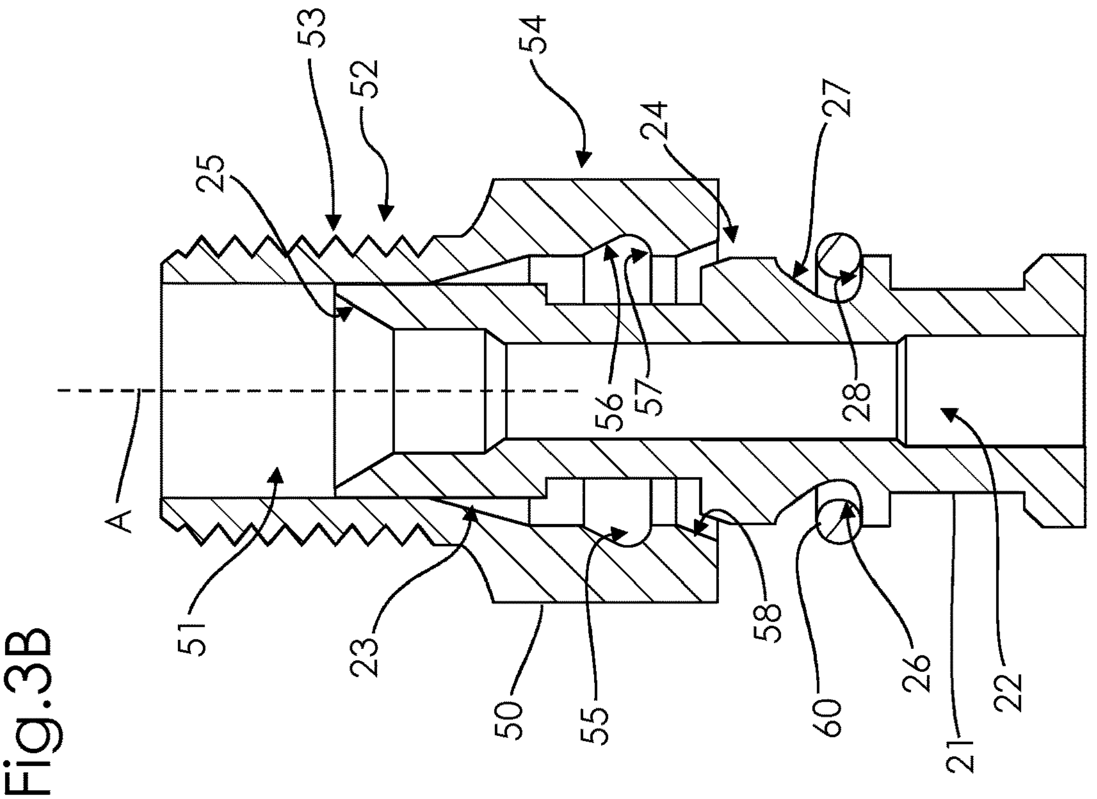
FIG. 3A-3E illustrate different assembly stages of the fuel-rail assembly of FIG. 1.
Figure 3A:
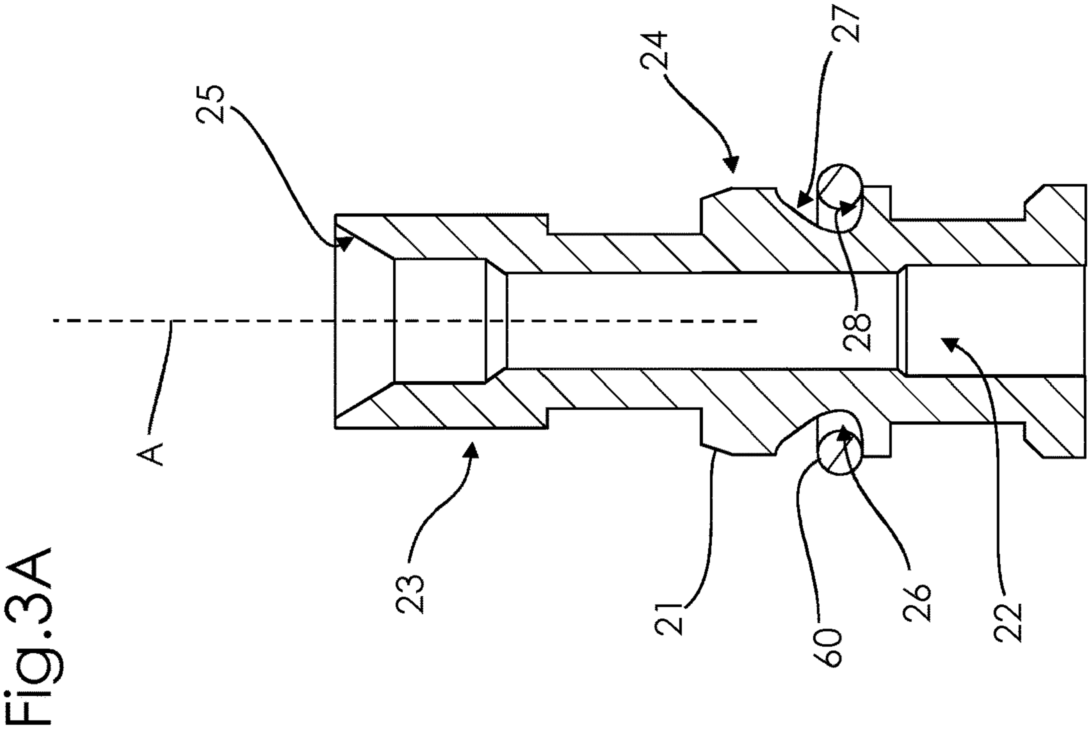

During assembly, the snap ring 60 is fitted over the inlet portion 21. First, the snap ring 60 has to be radially expanded to be passed over the first retainer portion 24. As the position of the first annular recess 26 is reached, the snap ring 60 contracts and is partially received in the first annular recess 26, as shown in FIG. 3A. Afterwards, the adapter 50 is passed over the inlet portion 21 from a proximal end thereof, i.e., starting at the mouth portion 23. Since the minimum inner radius R4 of the second retainer portion 54 is considerably larger than the maximum outer radius R1 of the mouth portion 23, there is no or only minimal initial contact between the adapter 50 and the inlet portion 21. When the thread portion 53 reaches the mouth portion 23, as shown in FIG. 3B, the adapter 50 is axially guided since the minimum inner radius R2 of the thread portion 53 is almost identical to the maximum outer radius R1 of the mouth portion 23.

Figure 3D:
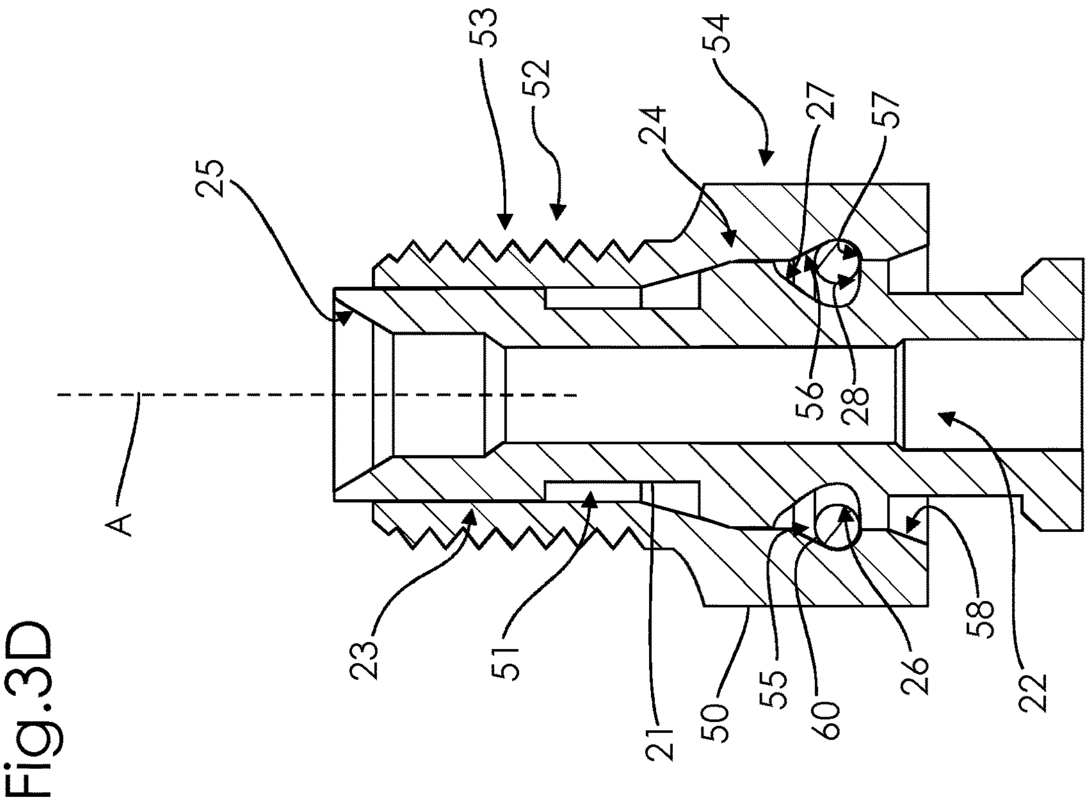
Figure 3C:
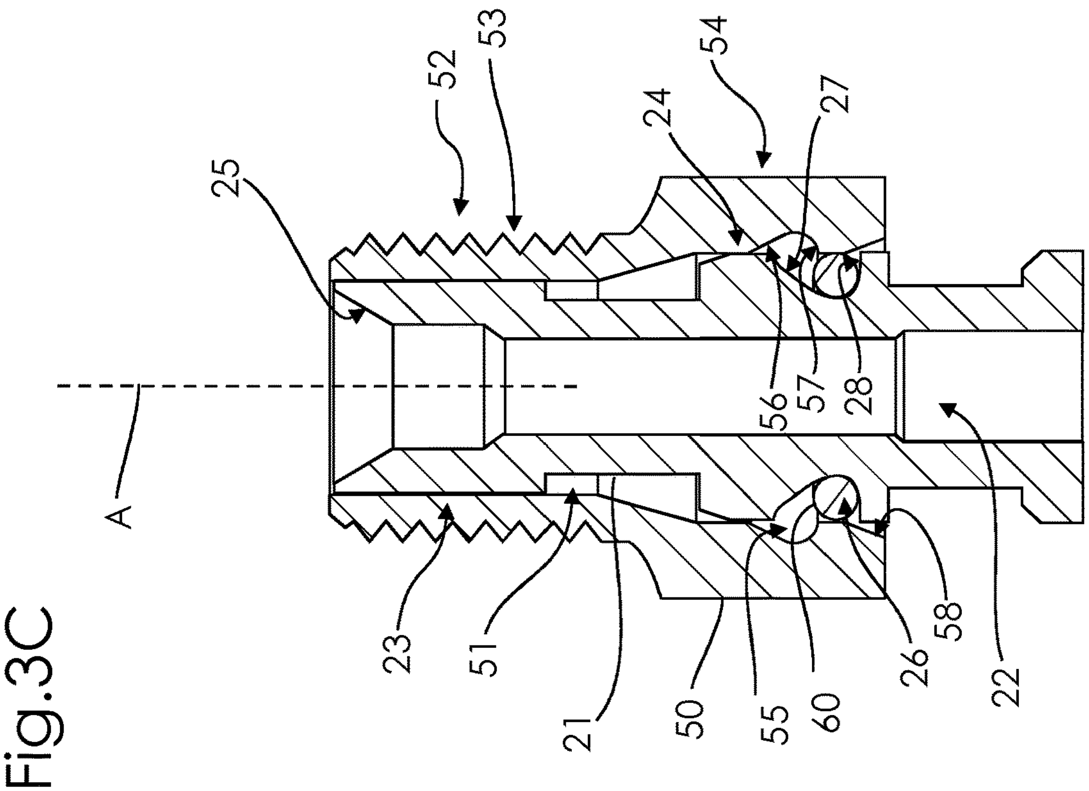

When the distal entry surface 58 makes contact with the snap ring 60, this results in a radial force component that radially compresses the snap ring 60 and causes it to fully move into the first annular recess 26, as shown in FIG. 3C. Accordingly, the second retainer portion 54 can move further to the distal side without being hindered by the snap ring 60, which in turn is held back by the first distal surface 28. In a next phase, which is illustrated in FIG. 3D, the second annular recess 55 reaches the position of the snap ring 60, thereby allowing it to expand to its previous diameter. If the adapter 50 was moved distally from the position shown in FIG. 3D, the interaction of the second proximal surface 56 with the snap ring 60 would lead to a radial compression of the snap ring 60, resulting in axial force component that pushes the adapter 50 to the proximal side, thereby giving haptic feedback e.g. to an assembler.

Figure 3E:
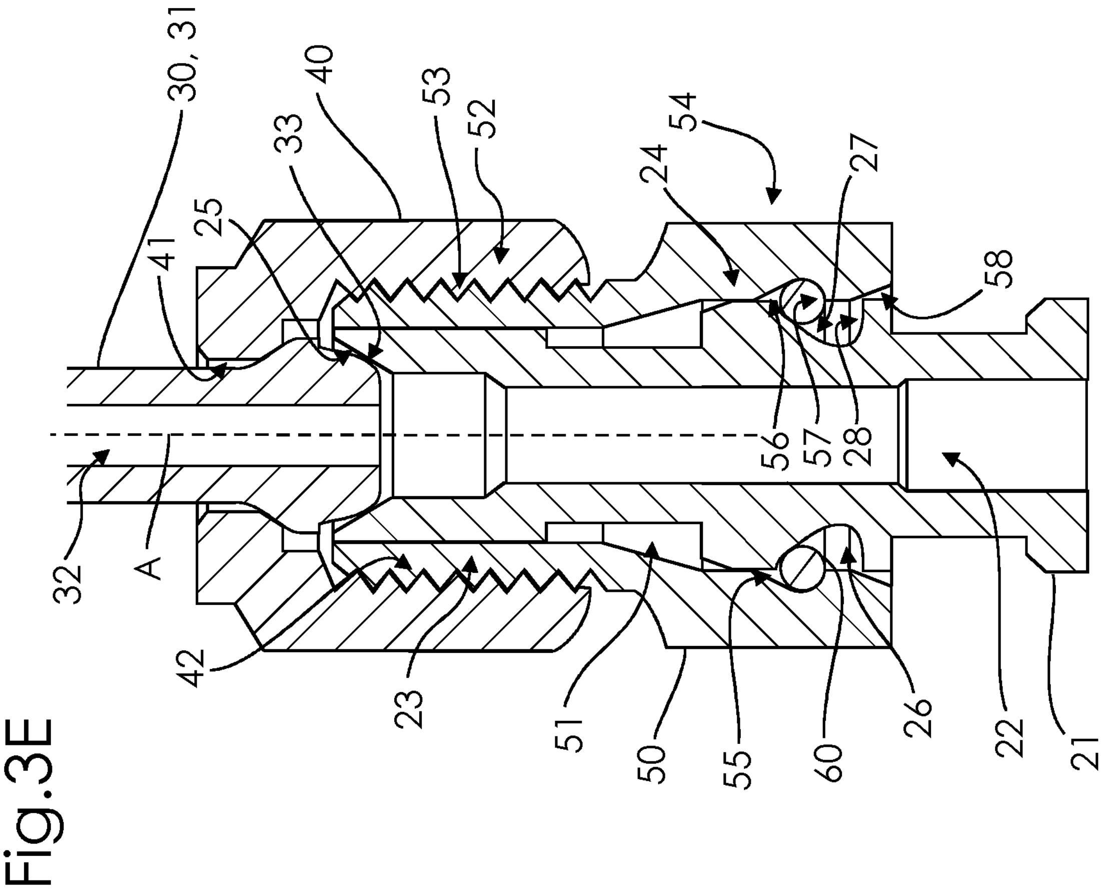

Next, the adapter 50 is pulled to the proximal side as the inner thread 42 and the outer thread 52 are screwed together. It should be noted that the adapter 50 as such is rotatable around the inlet portion 21, which may also facilitate the screwing process. As the adapter 50 moves proximally, the snap ring 60 is pulled along by its interaction with the second distal surface 57 so that it makes contact with the first proximal surface 27, as shown in FIG. 3E. The relatively moderate inclination of the first proximal surface 27 can lead to a gradually increasing force between the inlet portion 21, the snap ring 60 and the adapter 50.

LIST OF REFERENCE SIGNS

1 fuel-rail assembly
10 fuel rail
20 injector
21 inlet portion
22 inlet channel
23 mouth portion
24, 54 retainer portion
25, 33 contact surface
26, 55 annular recess
27, 56 proximal surface
28, 57 distal surface
30 pipe
31 outlet portion
32 outlet channel
40 nut element
41 flange
42 inner thread
50 adapter
51 through-opening
52 outer thread
53 thread portion
58 distal entrance surface
60 snap ring
A axial direction
R1, R3 maximum outer radius
R2, R4 minimum inner radius

The invention claimed is:

1. A fuel-rail assembly comprising:

an injector having a proximally disposed inlet portion defining an inlet channel and extending along an axial direction, a fuel rail connected to the inlet portion via an outlet portion that defines an outlet channel, a nut element having an inner thread and at least indirectly engaging the outlet portion to transfer an axial clamp force by which a first contact surface of the inlet portion is pressed against a second contact surface of the outlet portion to provide a fluid-tight connection between the inlet channel and the outlet channel, an adapter with an axially extending through-opening in which the inlet portion is at least partially received, and with an outer thread that engages the inner thread, which adapter at least indirectly presses against the inlet portion to transfer the clamp force, wherein at least one intermediate element is interposed between the adapter and the inlet portion, and the adapter indirectly engages the inlet portion via the at least one intermediate element, wherein the intermediate element is a snap ring made of metal, wherein the inlet portion comprises a first annular recess which extends radially inwards and in which the snap ring is partially disposed, and wherein the adapter comprises a second annular recess which extends radially outwards and in which the snap ring is partially disposed.

2. The fuel-rail assembly according to claim 1, wherein the outlet portion is part of a high-pressure pipe, which is connected to the fuel rail.

3. The fuel-rail assembly according to claim 1, wherein at least one of the inlet portion and the adapter comprises a radially extending recess in which at least one intermediate element is partially disposed, and at least one intermediate element is elastically deformable to be movable into the recess.

4. The fuel-rail assembly according to claim 1, wherein the snap ring tangentially extends over between 400° and 340°.

5. The fuel-rail assembly according to claim 1, wherein the first annular recess is at least partially defined by a first proximal surface that engages the snap ring and is inclined by less than 50° with respect to the axial direction, and a first distal surface, which is distally disposed from the first proximal surface and is inclined by more than 60° with respect to the axial direction.

6. The fuel-rail assembly according to claim 1, wherein the second annular recess is at least partially defined by a second proximal surface that is inclined by less than 50° with respect to the axial direction, and a second distal surface, which is distally disposed from the first proximal surface, which engages the snap ring and is inclined by more than 60° with respect to the axial direction.

7. The fuel-rail assembly according to claim 1, wherein the adapter comprises a thread portion, which comprises the outer thread and at least partially surrounds the mouth portion, and a second retainer portion, which engages the snap ring and which is disposed distally from the thread portion.

8. The fuel-rail assembly according to claim 1, wherein one of the first contact surface and the second contact surface is spherical and the other is conical.

9. The fuel-rail assembly according to claim 1, wherein the adapter comprises a distal entrance surface, which is distally disposed from the second annular recess and is inclined by less than 50° with respect to the axial direction.

10. The fuel-rail assembly according to claim 1, wherein the inlet portion comprises a mouth portion, which comprises the first contact surface, and a first retainer portion on which the first annular recess is disposed and which is disposed distally from the mouth portion.

11. The fuel-rail assembly according to claim 7, wherein a maximum radial outer dimension of the mouth portion is smaller than a maximum radial outer dimension of the first retainer portion, and a minimum radial inner dimension of the thread portion is smaller than a minimum radial inner dimension of the second retainer portion.

* * * * *